Aug. 20, 1968  TADAMICHI MORI ET AL  3,397,629
PHOTOGRAPHIC LIGHT CONTROL MEANS
Filed June 18, 1965  2 Sheets-Sheet 1
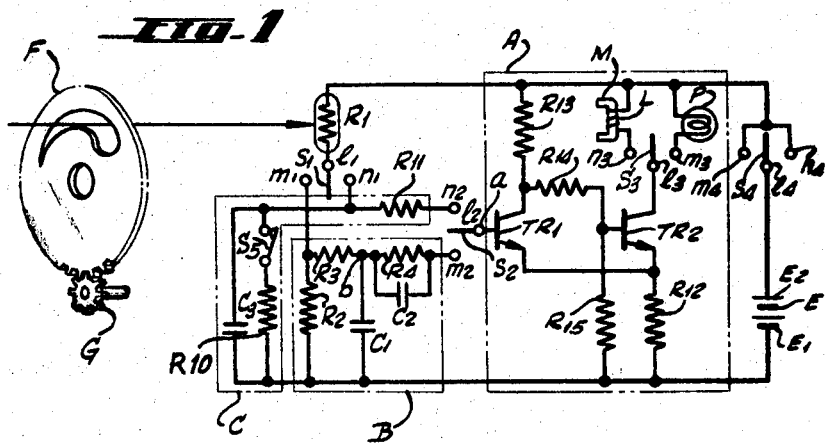
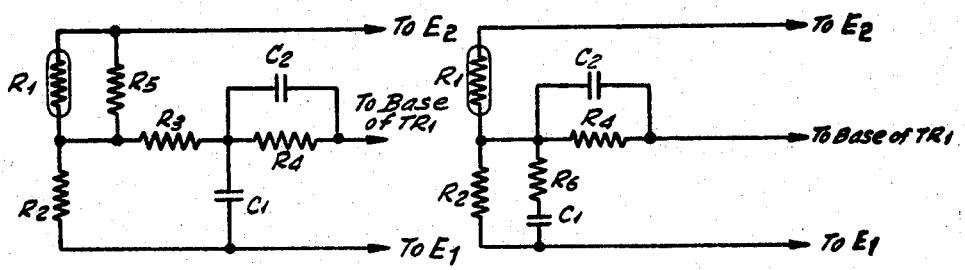
INVENTORS
TADAMICHI MORI
KOJI TANABE
BY Stanley Wolder
ATTORNEY

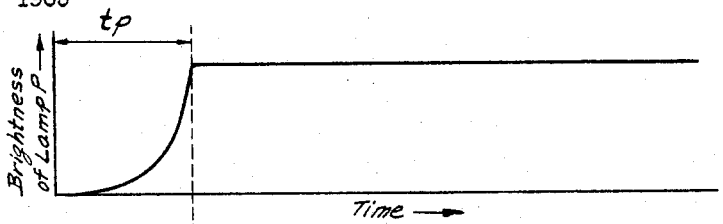
FIG.2A
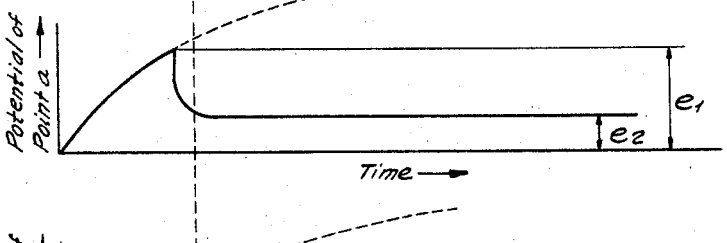
FIG.2B
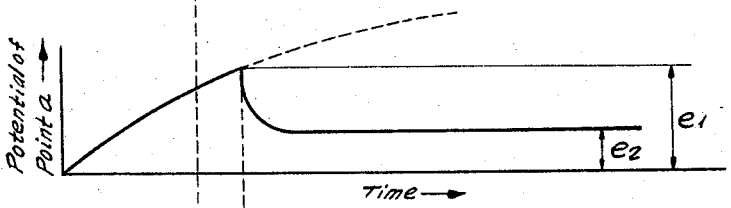
FIG.2C
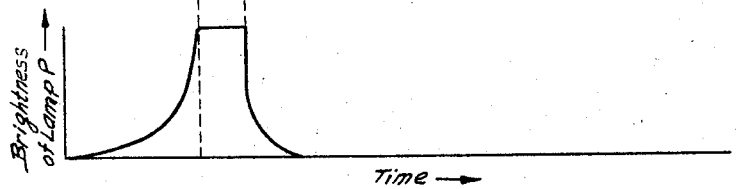
FIG.2D
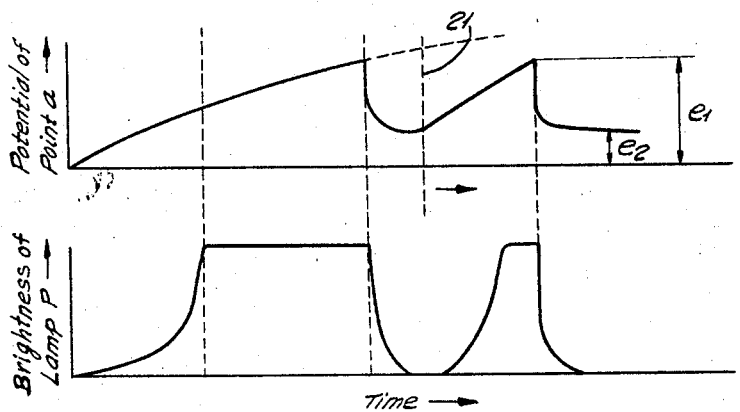
FIG.2E
FIG.2F
INVENTORS
TADAMICHI MORI
KOJI TANABE
BY Stanley Wolder
ATTORNEY

3,397,629

PHOTOGRAPHIC LIGHT CONTROL MEANS

Tadamichi Mori, Tokyo-to, and Koji Tanabe, Higashi-murayama-shi, Tokyo-to, Japan, assignors to Citizen Tokei Kabushiki Kaisha, Tokyo-to, Japan, a corporation of Japan
Filed June 18, 1965, Ser. No. 465,016
Claims priority, application Japan, June 20, 1964, 39/48,669
8 Claims. (Cl. 95—10)

ABSTRACT OF THE DISCLOSURE

A camera shutter timing network and light indicator includes a multivibrator switch whose output is alternatively selectively connected to a shutter closing electromagnet or an incandescent signal lamp forming a component of the multivibrator. The input to the multivibrator is alternatively connected, concurrently with the output selection, to a timing network including a photoconductor and charging capacitor, or to a signal network including the photoconductor. The signal network, signal lamp and multivibrator components are of such values that different steady state or varying light indications are provided by the lamp in accordance with the light incident in the photoconductor.

---

The present invention relates generally to improvements in cameras and it relates more particularly to an improved automatic exposure camera provided with means which furnish an indication of the light conditions as related to the exposure parameters of the camera.

In the conventional automatic exposure camera, the diaphragm opening, the shutter speed, or both exposure parameters are automatically adjusted in response to the lighting conditions as measured by a photosensitive device exposed to the incident light. It has been a common expedient in many of these cameras to provide an indicator which is movable with the diaphragm so as to provide information as to the suitability of the light conditions. The arrangements heretofore employed are generally of an electromechanical nature and possess many drawbacks and disadvantages. They are unreliable, of limited application, provide indications which are generally difficult to observe and interpret and otherwise leave much to be desired.

It is therefore a principal object of the present invention to provide an improved automatic exposure camera.

Another object of the present invention is to provide an improved automatic exposure camera having means for furnishing an indication of the light conditions.

Still another object of the present invention is to provide an improved automatic exposure camera having means for furnishing an indication of the suitability of light conditions as related to other exposure parameters.

A further object of the present invention is to provide and improved camera in which the shutter speed is automatically regulated in response to light conditions and having means which furnish an indication of the light conditions as related to the diaphragm opening and its suitability as related to the available shutter speeds.

Still a further object of the present invention is to provide a camera of the above nature characterized by its reliability, versatility and ease of use.

The above and other objects of the present invention will become apparent from a reading of the following description taken in conjunction with the accompanying drawings, wherein:

FIGURE 1 is a circuit diagram of a preferred embodiment of the present invention;

FIGURES 2A to 2F are graphs illustrating the switch triggering potentials and the indicator lamp intensities as related to time under different light conditions;

FIGURE 3 is a graph illustrating the relationship of the resistance of the light sensing photoconductor, the shutter exposure speed, and the illumination ranges of the indicating lamp;

FIGURE 4 is a circuit diagram of a modified indicator signal network; and

FIGURE 5 is a circuit diagram of another modified indicator signal network.

In a sense the present invention contemplates the provision of in a camera including a variable exposure mechanism, a photosensitive element, a first means responsive to said photosensitive element for controlling said exposure mechanism, a second means responsive to said photosensitive element for providing an indication of the amount of light incident thereon, and third means for selectively alternatively connecting said photosensitive element to said first and second means.

According to a preferred form of the present apparatus the photosensitive element is a photoconductor exposed to the camera incident light through an adjustable diaphragm coupled to the camera diaphragm. The photoconductor constitutes a resistance element in an RC timing network including a timing capacitor for closing the camera shutter upon the capacitor reaching a predetermined charge whereby to time the shutter opening in accordance with the incident light and diaphragm opening. The shutter closing network includes a multivibrator switch whose output is connected through a switch alternatively to a shutter closing actuator or an incandescent indicator lamp and whose input is connected through a switch alternatively to the shutter timing network or an indicator signal network. The photoconductor is likewise connected through a switch alternatively to the shutter timing network or the indicator signal network. The indicator signal network is so constructed as to provide signals to the switch input responsive to the resistance of the photoconductor whereby a different indication is provided by the lamp for a plurality of different light conditions.

Referring now to the drawings and particularly FIGURES 1 to 3 thereof which relate to a preferred embodiment of the present invention, the reference letter F generally designates an adjustable diaphragm disposed in the path of the light incident on a photoconductor $R_1$ which is directed toward the light incident on the main camera lens from the object being photographed. The diaphragm F is coupled by way of a gear G engaging the diaphragm disc F to the main camera diaphragm so that both diaphragms are simultaneously adjusted in a common sense.

The camera includes a shutter mechanism which after being cocked is released to an open position upon the depression of a release button and is then released to a closed position upon the sufficient de-energization of the solenoid L of an electromagnet M. A timing network C is associated with the photoconductor R and is selectively connected to the input of a multivibrator switch A which connects the electromagnet solenoid L to a battery E so that the electromagnet L is de-energized to close the camera shutter following a time responsive to the resistance of the photoconductor $R_1$. The above shutter control network is generally known in the art. In accordance with the present invention there is provided an indicator signal network B which alternatively with the timing network C is connected between the photoconductor $R_1$ and the multivibrator switch A, the electromagnet L being alternatively connected with an incandescent signal lamp P through the switch A across the battery E.

Specifically, the network C includes a first timing capacitor $C_3$ which is shunted by a discharge resistor $R_{10}$ through a normally closed switch $S_5$, one end of the capacitor $C_3$ being connected to the terminal $E_1$ of the battery E and the other end thereof being connected to a contact $n_1$ of a normally open double throw switch $S_1$ including an arm $l_1$ and an opposite contact $m_1$ and being connected through a resistor $R_{11}$ to a contact $n_2$ of a normally open double throw switch including a switch arm $l_2$ and an opposite contact $m_2$. The photoconductor $R_1$ has one end connected through a normally open switch $S_4$ to the terminal $E_2$ of the battery E and has its other end connected to the switch arm $l_1$.

The indicator signal network B includes a resistor $R_2$ connected between battery terminal $E_1$ and switch contact $m_1$, and series connected resistors $R_3$ and $B_4$ connected between switch contacts $m_1$ and $m_2$. A capacitor $C_1$ is connected between the junction point of resistors $R_3$ and $R_4$ and battery terminal $E_1$ and a capacitor $C_2$ shunts the resistor $R_4$.

The multivibrator switch A is of the emitter connected type and comprises a pair of transistors $TR_1$ and $TR_2$ the emitters of which are connected through a common resistor $R_{12}$ to the battery terminal $E_1$. The base of transistor $TR_1$ is connected to the switch arm $l_2$ and the collector theerof is connected through a resistor $R_{13}$ and switch $S_4$ to battery terminal $E_2$ and through a resistor $R_{14}$ to the base of the transistor $TR_2$, which base is connected through a resistor $R_{15}$ to the battery terminal $E_1$. The collector of the transistor $TR_2$ is connected to the arm $l_3$ of a normally open double throw switch $S_3$ provided with opposite contacts $m_3$ and $n_3$. The electromagnet solenoid L is connected between the switch contact $n_3$ and the battery terminal $E_2$ through the switch $S_4$ and the lamp P is connected between the switch contact $m_3$ and the battery terminal $E_2$ through the switch $S_4$. The switches $S_1$, $S_2$, $S_3$ and $S_4$ are ganged and concurrently actuated so that the switches are in an inactive position wherein switches $S_1$, $S_2$, $S_3$, and $S_4$ are open, the switches are in a first or indicator position wherein switch arms $l_1$, $l_2$ and $l_3$ concurrently engage contacts $m_1$, $m_2$ and $m_3$, or are in a second or shutter timing position wherein the switch arms $l_1$, $l_2$, and $l_3$ engage contacts $n_1$, $n_2$, and $n_3$. The switch $S_4$ is closed with either closing of the switches $S_1$, $S_2$ and $S_3$, the latter being effected by the camera release button in its shutter open position. The first or indicator position of the switches may likewise be effected by the camera release button but at a position before the shutter opening position, or in the alternative a separate button or means may be provided for effecting the aforesaid switch position.

In employing the camera described above the camera diaphragm is set to the desired opening and the diaphragm F is concurrently adjusted to control the light incident on the photoconductor $R_1$. When the camera shutter is opened the switches are in their second position with the $n$ contacts and switch $S_4$ closed and switch $S_5$ open to thereby time the closing of the camera shutter by way of the networks A and C, and electromagnet M in the known manner. However, in order to determine whether the light incident on the film is suitable within the camera shutter speed range the switches are first set in their first positions with the switch contacts $m_1$, $m_2$, $m_3$ closed and switch $S_4$ closed so as to interconnect the photoconductor $R_1$, networks A and B and indicator lamp P.

As shown in FIG. 3, the resistance value ranges of the photoconductor $R_1$ are related to exposure times as follows: range 31 is of improper exposure control because of excessive light or too bright object; range 32 is where proper exposure control is possible and there is no likelihood of camera body shaking effect; range 33 is where proper exposure control is possible but there is possibility of camera body shaking effect; and range 34 is of improper exposure control because of inadequate light or too poor illumination of the object.

Considering now the operation of the arrangement described above, upon switching the ganged switches to the indicating first position, the transistor $TR_2$ becomes conductive, and current flows through the lamp P. As shown in FIG. 2A, owing to the heat capacity of the filament, a time duration $tp$ is needed before the lamp P is lit. On the other hand, while the transistor $TR_1$ is non-conductive there is very little base current, so that the base potential of the transistor $TR_1$ (hereinafter referred to as "the potential of the point $a$") rises toward that potential value which divides the voltage of the power source E by the ratio of the resitsance value of the photoconductor $R_1$ to the resistance value of the resistor $R_2$, with the time constant as determined by the photoconductor $R_1$, the resistors $R_2$ and $R_3$ and the capacitor $C_1$, until the potential of the point $a$ reaches the trigger level $e_1$ of the switching circuit A and the transistor $TR_1$ becomes conductive. In addition, the input impedance of the switching circuit A suddenly drops so that the potential of the point $a$ drops to the value $e_2$ which is determined by the characteristics of the photoconductor $R_1$, the network B and the switching network A.

If the resistance value of the resistor $R_2$ is so selected that when the resistance value of the photoconductor $R_1$ is within the range 34 of FIG. 3 the potential of the point $a$ does not reach the trigger level $e_1$, then the changeover operation of the switching circuit is not effected and the lamp P is lit as shown in FIG. 2A. This continuously lit condition of the lamp P can be utilized as an indication of improper exposure control due to inadequate light or too poor illumination of the object, or alternatively as an indication signal for enlarging the diaphragm aperture.

In the event that the resistance value of the photoconductor $R_1$ is within the range 31 of FIG. 3, if the resistor $R_3$ and the capacitor $C_1$ are so selected that the potential of the point $a$ reaches the trigger level $e_1$ within a time which is shorter than the lamp lighting delay time $tp$, as shown in FIG. 2B, then before the lighting of the lamp P the transistor $TR_2$ becomes non-conductive and the transistor $TR_1$ becomes conductive. Then, if the circuit constants are so selected as to hold the transistor $TR_1$ in conductive condition, the lamp P remains unlit. This unlit condition can be utilized either as an indication of improper exposure control due to excessively high illumination of the object or as indication signal for stopping down the diaphragm aperture.

If at the largest or the smallest aperture due to operation of the diaphragm plate F the lamp P remains lit or non-lit, respectively, then it is understood that the object illumination in either case exceeds the photographing power range of the camera.

When the resistance value of the photoconductor $R_1$ is within the range 33 of FIG. 3, after a lapse of time which is longer than the lamp lighting delay time $tp$, the potential of the point $a$ reaches the trigger level $e_1$, as shown in FIG. 2E, then drops to the level $e_2$, as described above. Now if the resistor $R_4$ is so selected that the transistor $TR_1$ is not continuously held in conductive condition, then, as shown in FIG. 2E, the potential of the point $a$ continues to raise while the transistor $TR_1$ remains non-conductive until the trigger lever $e_1$ is reached, the switching circuit A is changed-over and the transistor $TR_1$ becomes conductive.

Upon this change-over operation, however, the potential of the point $b$ as shown in FIG. 1 begins to drop as the discharge current flows from the capacitor $C_1$, the base current of the transistor $TR_1$ flowing from the point $b$ to the point $a$ decreases until, as shown in the time point 21 in FIG. 2E, the transistor $TR_1$ becomes non-conductive and the potential of the point $a$ begins to rise. The repetition of such phenomenon causes the lamp P to be alternately lit and extinguished.

The difference between the duration of the first period and that of the second and of each of the further ensuing periods is due to the fact that the capacitor $C_1$ is rapidly discharged owing to the existence of the capacitor $C_2$ and that the capacitor $C_1$ is not completely discharged. Accordingly, by selecting large or small capacity of the capacitor $C_2$, the lighting period of the lamp P can be made short or long, respectively.

This condition of the lamp P being lighted and turned off alternately can be utilized as an indication of the situation where proper exposure control is possible but there is the possibility of camera body shaking effect.

Finally, when the resistance value of the photoconductor $R_1$ lies within the range 32 of FIG. 3, the time taken by the rising potential of the point $a$ to reach the trigger level $e_1$ is longer than the lamp lighting delay time $tp$ and once the transistor $TR_1$ becomes conductive it is held in this constant conductive condition. Accordingly, as shown in FIG. 2D, the lamp P is once lit or lit and turned off several times, and then remains unlit. Such phenomenon can be utilized to indicate that under the corresponding object brightness the proper exposure control is possible and the possiblity of the camera body shaking effect is low.

The indicator signal circuit including the photoconductor $R_1$ and the network B may be modified as shown in FIGURES 4 and 5, the rest of the circuit remaining as described above. In the embodiment of FIG. 4, a resistor $R_5$ is inserted in parallel with the photoconductor $R_1$. This arrangement is effective for further shift to the right of the limit 37 in FIG. 3. In the embodiment of FIG. 5, the resistor $R_3$ is eliminated and a resistor $R_6$ is inserted in series with the capacitor $C_1$ so that the limit 35 of FIG. 3 can shift in wider range. In order to make the range 33 of FIG. 3 so narrow as to provide an indication almost of three-stage type, the resistor $R_4$ and the capacitor $C_2$ may be eliminated from the arrangement of FIG. 1 and the point $a$ may be connected to the point $b$. Further, if the resistance value of the resistor $R_3$ is made sufficiently small and the capacitor $C_1$ is eliminated, then the ranges 32 and 33 of FIG. 3 is indicated in the same manner as that of the range 31 of FIG. 3, and accordingly a two-stage indication system is obtained.

As mentioned above, a four-stage indication system can be obtained by using a photoconductor as an element of the time constant circuit, arranging a lamp in a circuit which makes a switching operation by the potential variation of said time constant circuit, and utilizing the filament heating time capacity effect of this lamp. By selecting appropriate circuit constants for the time constant circuit and the switching circuit in a manner known to those skilled in the art in view of the above, these four indications can be made to respectively correspond to a range of improper exposure control due to excessively high illumination of the object; to a range of proper exposure control without the possibility of camera body shaking effect; to a range of proper exposure control but with the likelihood of camera body shaking effect; and to a range of improper exposure control due to excessively low illumination of the object. Accordingly, an indicator arrangement is provided which enables the user to readily know the exposure time range and which is excellent in shake-resistant nature, in durability and in stability.

While there have been described and illustrated preferred embodiments of the present invention, it is apparent that numerous alterations, omissions and additions may be made without departing from the spirit thereof.

What is claimed is:

1. In a camera including a variable speed shutter, a photoconductor, means responsive to said photoconductor for controlling the speed of said shutter, means comprising an RC network with said photoconductor as an element thereof for providing an indication of the amount of light incident thereon by producing an output signal which is a function of the resistance of said photoconductor, a switch responsive to said output signal, a source of current, and an incandescent lamp connected through said switch to said source of current.

2. In a camera including a variable speed shutter, a photoconductor, a multivibrator switch including an input control terminal, an incandescent lamp, an electrically actuated shutter control member, a source of current, a first double throw switch movable between first and second positions connecting said shutter control member and said incandescent lamp respectively through said multivibrator switch across said source of current, a first switch control network including a timing first capacitor, a second switch control network, a second double throw switch movable between first and second positions connecting said first switch control network and said second switch control network respectively to said photoconductor, and a third double throw switch movable between first and second positions connecting the outputs of said first and second switch control network respectively to the input of said multivibrator switch, said first, second and third switches being concurrently movable to said first and second positions respectively.

3. The camera of claim 2 wherein said second switch control network includes a first resistor connected through said second switch in series with said photoconductor, and connected through said third switch across the input to said multivibrator switch.

4. The camera of claim 3 including a timing second capacitor connected across said first resistor.

5. The camera of claim 3 including a second resistor, the junction point of said photoconductor and said first resistor being connected through said second resistor and said third switch to the input to said multivibrator switch.

6. The camera of claim 3 including a second resistor and a third capacitor shunting said second resistor, the junction point of said photoconductor and said first resistor being connected through said second resistor and said third switch to the input to said multivibrator switch.

7. The camera of claim 3 including a normally open fourth switch connected between said source of current and said multivibrator switch and closed concurrently with said first, second and third switches.

8. The camera of claim 3 including a normally closed fifth switch connected across said timing first capacitor and opened with said first, second and third switch, in said first position.

References Cited
UNITED STATES PATENTS

| | | | |
|---|---|---|---|
| 3,063,354 | 11/1962 | Matulik et al. | 95—10 |
| 3,208,365 | 9/1965 | Cooper et al. | |
| 3,232,191 | 2/1966 | Sherwood | 95—10 |
| 3,292,516 | 12/1966 | Sato et al. | 95—10 |

NORTON ANSHER, *Primary Examiner.*

J. F. PETERS, *Assistant Examiner.*